United States Patent

Burke et al.

US010192414B2

(10) Patent No.: US 10,192,414 B2
(45) Date of Patent: Jan. 29, 2019

(54) SYSTEM AND METHOD FOR OVERLAP DETECTION IN SURVEILLANCE CAMERA NETWORK (71) Applicant: Sensormatic Electronics, LLC, Boca Raton, FL (US)

(72) Inventors: Anthony Burke, Noblesville, IN (US); Scott Humphreys, Indianapolis, IN (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 136 days.

(21) Appl. No.: 15/076,706

(22) Filed: Mar. 22, 2016

(65) Prior Publication Data

US 2017/0278367 A1    Sep. 28, 2017

(51) Int. Cl.
*G08B 13/19* (2006.01)
*G08B 13/196* (2006.01)
(Continued)

(52) U.S. Cl.
CPC .... *G08B 13/19641* (2013.01); *G06K 9/00711* (2013.01); *G06T 7/2093* (2013.01);
(Continued)

(58) Field of Classification Search
CPC ........ G08B 13/19641; G08B 13/19608; G08B 13/19684; G06T 7/292; G06T 7/2093;
(Continued)

(56) References Cited

U.S. PATENT DOCUMENTS 3,217,098 A * 11/1965 Oswald ................. H04N 7/181
346/107.2
4,940,925 A * 7/1990 Wand .................. G05D 1/0246
318/580
(Continued)

FOREIGN PATENT DOCUMENTS

EP    2 164 003 A1    3/2010
EP    2 538 672 A1    12/2012
(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.
International Search Report and the Written Opinion of the International Searching Authority, dated Jun. 12, 2017 from International Application No PCT/US2017/023440, filed on Mar. 21, 2017. Fourteen pages.
(Continued)

*Primary Examiner* — Manav Seth
(74) *Attorney, Agent, or Firm* — HoustonHogle LLP (57) ABSTRACT

A system and method for overlap detection in a surveillance camera network is disclosed. An analytics system of the system receives image data captured from the cameras and detects motion within the image data. The analytics system then correlates detected motion among the image data from the different cameras and determines overlap of fields of view of the cameras. In a preferred embodiment, a mobile user device held by an installer is moved through a critical path at the premises while the cameras are capturing the image data, and the analytics system determines whether the user device/installer is included in the image data from at least two of the cameras. In another embodiment, the analytics system determines overlap by determining corre-
(Continued)

lated motion detection events associated with motion occurring at substantially the same time in image data from two or more different surveillance cameras and inferring that the motion is related.

16 Claims, 7 Drawing Sheets

(51) Int. Cl.
  *G06T 7/20* (2017.01)
  *H04N 7/18* (2006.01)
  *G06K 9/00* (2006.01)
  *G06T 7/292* (2017.01)

(52) U.S. Cl.
  CPC ........ *G06T 7/292* (2017.01); *G08B 13/19608* (2013.01); *G08B 13/19684* (2013.01); *H04N 7/181* (2013.01); *G06T 2207/30232* (2013.01); *G06T 2207/30244* (2013.01)

(58) Field of Classification Search
  CPC .......... G06T 2207/30232; G06T 2207/30244; G06K 9/00711; H04N 7/181
  See application file for complete search history.

(56) References Cited

U.S. PATENT DOCUMENTS

| | | | | |
|---|---|---|---|---|
| 5,164,827 A * | 11/1992 | Paff | G08B 13/19608 | 348/143 |
| 5,204,536 A * | 4/1993 | Vardi | B60T 7/22 | 250/551 |
| 5,317,394 A * | 5/1994 | Hale | H04N 7/181 | 348/147 |
| 5,729,471 A * | 3/1998 | Jain | G06T 15/10 | 345/419 |
| 5,850,352 A * | 12/1998 | Moezzi | H04N 13/139 | 345/419 |
| 5,940,538 A * | 8/1999 | Spiegel | G06T 7/246 | 345/473 |
| 5,969,755 A * | 10/1999 | Courtney | G06F 17/3079 | 348/135 |
| 6,341,183 B1 * | 1/2002 | Goldberg | G06F 3/005 | 382/276 |
| 6,359,647 B1 * | 3/2002 | Sengupta | G08B 13/19608 | 348/154 |
| 6,581,000 B2 * | 6/2003 | Hills | G01C 21/12 | 340/988 |
| 6,724,421 B1 * | 4/2004 | Glatt | G08B 13/19608 | 348/143 |
| 6,812,835 B2 * | 11/2004 | Ito | G08B 13/19604 | 340/541 |
| 6,970,083 B2 * | 11/2005 | Venetianer | G06K 9/00778 | 340/541 |
| 7,242,423 B2 * | 7/2007 | Lin | G08B 13/19645 | 348/169 |
| 7,286,157 B2 * | 10/2007 | Buehler | G06K 9/00771 | 348/143 |
| 7,342,489 B1 * | 3/2008 | Milinusic | G08B 13/19604 | 340/506 |
| 7,382,244 B1 | 6/2008 | Donovan et al. | | |
| 7,409,076 B2 * | 8/2008 | Brown | G06K 9/00778 | 348/169 |
| 7,450,735 B1 * | 11/2008 | Shah | G06T 7/292 | 348/143 |
| 7,456,596 B2 * | 11/2008 | Goodall | G05D 1/0274 | 318/568.11 |
| 7,460,149 B1 | 12/2008 | Donovan et al. | | |
| 7,529,388 B2 * | 5/2009 | Brown | G06K 9/00778 | 348/169 |
| 7,623,152 B1 | 11/2009 | Kaplinsky | | |
| 7,623,676 B2 * | 11/2009 | Zhao | G06K 9/00369 | 348/580 |
| 7,733,375 B2 * | 6/2010 | Mahowald | H04N 1/00002 | 348/207.99 |
| 8,249,301 B2 * | 8/2012 | Brown | G06K 9/00369 | 348/169 |
| 8,300,102 B2 * | 10/2012 | Nam | G06K 9/00771 | 348/169 |
| 8,482,609 B1 * | 7/2013 | Mishra | H04N 7/181 | 348/143 |
| 8,483,490 B2 * | 7/2013 | Brown | G06K 9/00369 | 382/103 |
| 8,502,868 B2 * | 8/2013 | Buehler | G08B 13/19693 | 348/143 |
| 8,594,482 B2 * | 11/2013 | Fan | G08B 13/196 | 386/200 |
| 8,675,074 B2 * | 3/2014 | Salgar | H04N 7/181 | 348/143 |
| 8,723,952 B1 | 5/2014 | Rozenboim | | |
| 8,995,712 B2 * | 3/2015 | Huang | G06K 9/00771 | 348/135 |
| 9,015,167 B1 | 4/2015 | Ballou et al. | | |
| 9,058,520 B2 * | 6/2015 | Xie | G06K 9/00624 | |
| 9,094,615 B2 * | 7/2015 | Aman | G01S 3/7864 | |
| 9,129,179 B1 | 9/2015 | Wong | | |
| 9,158,975 B2 * | 10/2015 | Lipton | G06K 9/00771 | |
| 9,168,882 B1 | 10/2015 | Mirza et al. | | |
| 9,197,861 B2 * | 11/2015 | Saptharishi | H04N 7/18 | |
| 9,280,833 B2 * | 3/2016 | Brown | G06T 7/80 | |
| 9,412,269 B2 * | 8/2016 | Saptharishi | G08G 1/0133 | |
| 9,495,614 B1 | 11/2016 | Boman et al. | | |
| 9,594,963 B2 * | 3/2017 | Bobbitt | G06K 9/00718 | |
| 9,641,763 B2 * | 5/2017 | Bernal | H04N 5/23296 | |
| 9,674,458 B2 | 6/2017 | Teich et al. | | |
| 9,785,898 B2 | 10/2017 | Hofman et al. | | |
| 9,860,554 B2 * | 1/2018 | Samuelsson | H04N 19/527 | |
| 9,967,446 B2 * | 5/2018 | Park | H04N 5/23203 | |
| 2002/0104098 A1 | 8/2002 | Zustak et al. | | |
| 2003/0107649 A1 * | 6/2003 | Flickner | G06K 9/00362 | 348/150 |
| 2003/0169337 A1 | 9/2003 | Wilson et al. | | |
| 2005/0012817 A1 | 1/2005 | Hampapur et al. | | |
| 2005/0057653 A1 | 3/2005 | Maruya | | |
| 2006/0001742 A1 | 1/2006 | Park | | |
| 2006/0181612 A1 | 8/2006 | Lee et al. | | |
| 2006/0239645 A1 * | 10/2006 | Curtner | G06F 17/3079 | 386/228 |
| 2006/0243798 A1 * | 11/2006 | Kundu | G06Q 20/00 | 235/383 |
| 2007/0178823 A1 | 8/2007 | Aronstam et al. | | |
| 2007/0279494 A1 * | 12/2007 | Aman | G01S 3/7864 | 348/169 |
| 2007/0294207 A1 | 12/2007 | Brown et al. | | |
| 2008/0004036 A1 * | 1/2008 | Bhuta | G01S 5/0252 | 455/456.1 |
| 2008/0101789 A1 | 5/2008 | Sharma | | |
| 2008/0114477 A1 | 5/2008 | Wu | | |
| 2008/0158336 A1 | 7/2008 | Benson et al. | | |
| 2009/0237508 A1 * | 9/2009 | Arpa | G06T 15/205 | 348/153 |
| 2009/0268033 A1 | 10/2009 | Ukita | | |
| 2009/0273663 A1 | 11/2009 | Yoshida | | |
| 2009/0284601 A1 | 11/2009 | Eledath et al. | | |
| 2010/0013917 A1 * | 1/2010 | Hanna | G06K 9/00771 | 348/143 |
| 2010/0110212 A1 | 5/2010 | Kuwahara et al. | | |
| 2010/0153182 A1 | 7/2010 | Quinn et al. | | |
| 2011/0043631 A1 * | 2/2011 | Marman | H04N 5/772 | 348/143 |
| 2011/0128384 A1 | 6/2011 | Tiscareno et al. | | |
| 2011/0246626 A1 | 10/2011 | Peterson et al. | | |
| 2012/0072420 A1 | 3/2012 | Moganti et al. | | |
| 2012/0206605 A1 | 8/2012 | Buehler et al. | | |
| 2012/0226526 A1 | 9/2012 | Donovan et al. | | |
| 2013/0169801 A1 | 7/2013 | Martin et al. | | |
| 2013/0223625 A1 | 8/2013 | de Waal et al. | | |
| 2013/0278780 A1 | 10/2013 | Cazier et al. | | |
| 2013/0343731 A1 | 12/2013 | Pashkevich et al. | | |
| 2014/0085480 A1 | 3/2014 | Saptharishi | | |
| 2014/0211018 A1 | 7/2014 | de Lima et al. | | |

(56) References Cited

U.S. PATENT DOCUMENTS

| | | |
|---|---|---|
| 2014/0218520 A1 | 8/2014 | Teich et al. |
| 2014/0330729 A1 | 11/2014 | Colangelo |
| 2015/0039458 A1 | 2/2015 | Reid |
| 2015/0092052 A1 | 4/2015 | Shin et al. |
| 2015/0121470 A1 | 4/2015 | Rongo et al. |
| 2015/0208040 A1 | 7/2015 | Chen et al. |
| 2015/0215583 A1 | 7/2015 | Chang |
| 2015/0244992 A1* | 8/2015 | Buehler ........... G08B 13/19602 348/159 |
| 2015/0249496 A1 | 9/2015 | Muijs et al. |
| 2015/0358576 A1 | 12/2015 | Hirose et al. |
| 2015/0379729 A1 | 12/2015 | Datta et al. |
| 2016/0065615 A1 | 3/2016 | Scanzano et al. |
| 2016/0269631 A1* | 9/2016 | Jiang ................... H04N 5/23238 |
| 2016/0379074 A1 | 12/2016 | Nielsen et al. |
| 2017/0278365 A1* | 9/2017 | Madar .................. G06K 7/1092 |
| 2017/0278367 A1* | 9/2017 | Burke .................... G06T 7/2093 |
| 2017/0278368 A1* | 9/2017 | Burke ............. G08B 13/19656 |
| 2017/0280043 A1* | 9/2017 | Burke ................ H04N 5/23206 |
| 2017/0280102 A1* | 9/2017 | Burke .................... H04N 7/181 |
| 2017/0280103 A1* | 9/2017 | Burke .................... H04N 7/181 |

FOREIGN PATENT DOCUMENTS

| | | |
|---|---|---|
| JP | 2003/151048 A | 5/2003 |
| JP | 2010/074382 A | 4/2010 |
| WO | 2007/030168 A1 | 3/2007 |
| WO | 2013/141742 A1 | 9/2013 |
| WO | 2014/114754 A1 | 7/2014 |

OTHER PUBLICATIONS

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 19, 2017, from International Application No. PCT/US2017/023444, filed on Mar. 21, 2017. Thirteen pages.

International Search Report and the Written Opinion of the International Searching Authority, dated Jun. 28, 2017, from International Application No. PCT/US2017/023434, filed on Mar. 21, 2017. Thirteen pages.

* cited by examiner

SYSTEM AND METHOD FOR OVERLAP DETECTION IN SURVEILLANCE CAMERA NETWORK

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No.: 2017/0278368 A1;

U.S. application Ser. No. 15/076,703 filed on Mar. 22, 2016, entitled "Method and system for pooled local storage by surveillance cameras," now U.S. Patent Publication No.: 2017/0280102 A1;

U.S. application Ser. No. 15/076,704 filed on Mar. 22, 2016, entitled "System and method for designating surveillance camera regions of interest," now U.S. Patent Publication No.: 2017/0277967 A1;

U.S. application Ser. No. 15/076,705 filed on Mar. 22, 2016, entitled "System and method for deadzone detection in surveillance camera network," now U.S. Patent Publication No.: 2017/0278366 A1;

U.S. application Ser. No. 15/076,708 filed on Mar. 22, 2016, entitled "System and method for retail customer tracking in surveillance camera network," now U.S. Patent Publication No.: 2017/0278137 A1;

U.S. application Ser. No. 15/076,709 filed on Mar. 22, 2016, entitled "Method and system for modeling image of interest to users," now U.S. Patent Publication No.: 2017/0277785 A1;

U.S. application Ser. No. 15/076,710 filed on Mar. 22, 2016, entitled "System and method for using mobile device of zone and correlated motion detection," now U.S. Patent Publication No.: 2017/0280103 A1;

U.S. application Ser. No. 15/076,712 filed on Mar. 22, 2016, entitled "Method and system for conveying data from monitored scene via surveillance cameras," now U.S. Pat. No. 9,965,680;

U.S. application Ser. No. 15/076,713 filed on Mar. 22, 2016, entitled "System and method for configuring surveillance cameras using mobile computing devices," now U.S. Patent Publication No.: 2017/0278365 A1; and U.S. application Ser. No. 15/076,717 filed on Mar. 22, 2016, entitled "System and method for controlling surveillance cameras," now U.S. Patent Publication No.: 2017/0280043 A1.

All of the afore-mentioned applications are incorporated herein by this reference in their entirety.

BACKGROUND OF THE INVENTION

Surveillance camera systems are often deployed to collect image data within or around premises. Examples of premises include governmental buildings, office buildings, retail establishments, and single and multi-unit residences. The cameras are typically installed to monitor and detect individuals and/or activities at different locations in and around the premises.

A successful installation of surveillance camera systems requires careful consideration of several factors. The designers/installers select the locations in which to install the cameras, select the type of camera that is best suited for each location, and then position the cameras' fields of view to capture scenes at each location. For example, point of sale areas might require one or more ceiling mounted, dome style cameras to capture transaction-related activities within the locations. For monitoring large open areas such as shopping malls, open-floor plan offices, and parking lots, either panoramic view (e.g. "fish eye") cameras or pan-tilt-zoom (PTZ) cameras are often utilized because of each camera's ability to provide wider fields of view and to scan the areas, respectively. Designers/installers might also position the fields of view of different surveillance cameras to overlap, and also position the field of view of one camera to include another surveillance camera. These actions provide different views or perspectives of the same scene and the ability to capture attempts at tampering with the surveillance cameras.

Analytics systems are often part of surveillance camera systems. At a basic level, the analytics systems provide the ability to detect and track individuals and objects within the image data of the monitored scenes. Other capabilities include the ability to determine motion of objects relative to visual cues superimposed upon the image data and to search for specific behaviors of interest within the image data. The visual cues are often placed near fixed objects in the background scene of the image data to infer motion of objects relative to the visual cues. In one example, virtual tripwire visual cues can be located near entryways within the scene to detect entry or exit of individuals through the entryways and to provide a count of the individuals passing through the entryway over a specific time period. These analytics systems can provide both real-time analysis of live image data and forensic analysis of previously recorded image data.

SUMMARY OF THE INVENTION

It would be beneficial to determine overlap among fields of view of surveillance cameras during the installation of the surveillance cameras using an analytics system, for example. In contrast, installers of current surveillance camera systems might typically use an "educated guess" approach for installing surveillance cameras to provide the desired level of overlap among the fields of view, where the experience of the installer is paramount to achieving this objective.

It would also be beneficial to infer overlap among fields of view of surveillance cameras from image data captured by the surveillance cameras. Such a capability could allow system operators to better interpret image data from different cameras. Moreover, the analytics systems could use this information to present image data to operators in a way that is easier to grasp context.

The present invention provides for the ability to analyze image data from multiple surveillance cameras. It does this analysis using a mobile computing device such as a smartphone or tablet computing device or even a laptop computer. These modern devices have excellent image data processing resources and can be used to tap the image data feeds from nearby surveillance cameras and analyze that image data to provide information on the configuration of the system as a whole.

In general, according to one aspect, the invention features a method for determining overlap for a network of surveillance cameras. The method comprises detecting motion within image data from the network of surveillance cameras, correlating detected motion among the image data from different surveillance cameras, and determining overlap of fields of view of the surveillance cameras.

In embodiments, motion is detected within image data from the network of surveillance cameras by tracking a mobile user device and/or an installer carrying the mobile user device as the mobile user device is moved along a critical path within a premises.

For example, a mobile user device might be used for traversing a critical path within a premises and the correlated detected motion detected within the image data to determine whether the mobile user device and/or the installer is included in the image data from at least two of the surveillance cameras.

Objects can be identified within the image data and the objects tracked across the fields of view of the surveillance cameras. Motion detection events can be generated in response to detecting motion within the image data, and correlating the motion detection events.

In some embodiments, a display grid is provided, which includes image data from at least two surveillance cameras having at least one portion of an object within a scene monitored by the surveillance cameras included within the image data, and sending the display grid for display on a mobile user device.

In general, according to another aspect, the invention features a method for determining overlap of fields of view for surveillance cameras of a network. The method comprises defining a path within monitored by the surveillance cameras via a mobile user device carried by the installer, the surveillance cameras capturing image data of the scene during the definition of the path and transferring the image data to an analytics system, and the analytics system determining overlap from the image data.

In general, according to another aspect, the invention features a method for determining overlap of fields of view for surveillance cameras. This method comprises receiving time-stamped image data from two or more surveillance cameras, analyzing the image data to determine correlated motion, and determining overlap of the fields of view based on the correlated motion.

In general, according to still another aspect, the invention features a surveillance camera system, which comprises two or more surveillance cameras generating image data of a scene and an analytics system that receives the image data from the two or more surveillance cameras and determines overlap within the scene by determining whether the image data from at least two of the surveillance cameras includes correlated motion.

In general, according to still another aspect, the invention features a surveillance camera system, comprising two or more surveillance cameras generating image data of a scene and an analytics system that receives the image data from the surveillance cameras and determines overlap within the scene by correlating detected motion among the image data from different surveillance cameras, and by determining that the correlated detected motion occurs at substantially the same time in the image data from two or more different surveillance cameras and inferring that the motion is related.

In general, according to still another aspect, the invention features a surveillance camera system. The system comprises a mobile user device for defining a critical path, surveillance cameras capturing image data capturing image data along the critical path and an analytics system determining overlap of fields of view of the surveillance cameras from the image data.

In general, according to still another aspect, the invention features surveillance camera system. This system comprises surveillance cameras for generating time-stamped image data and an analytics system for determine correlated motion in the image data and determining overlap of fields of view of the surveillance cameras based on the correlated motion.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
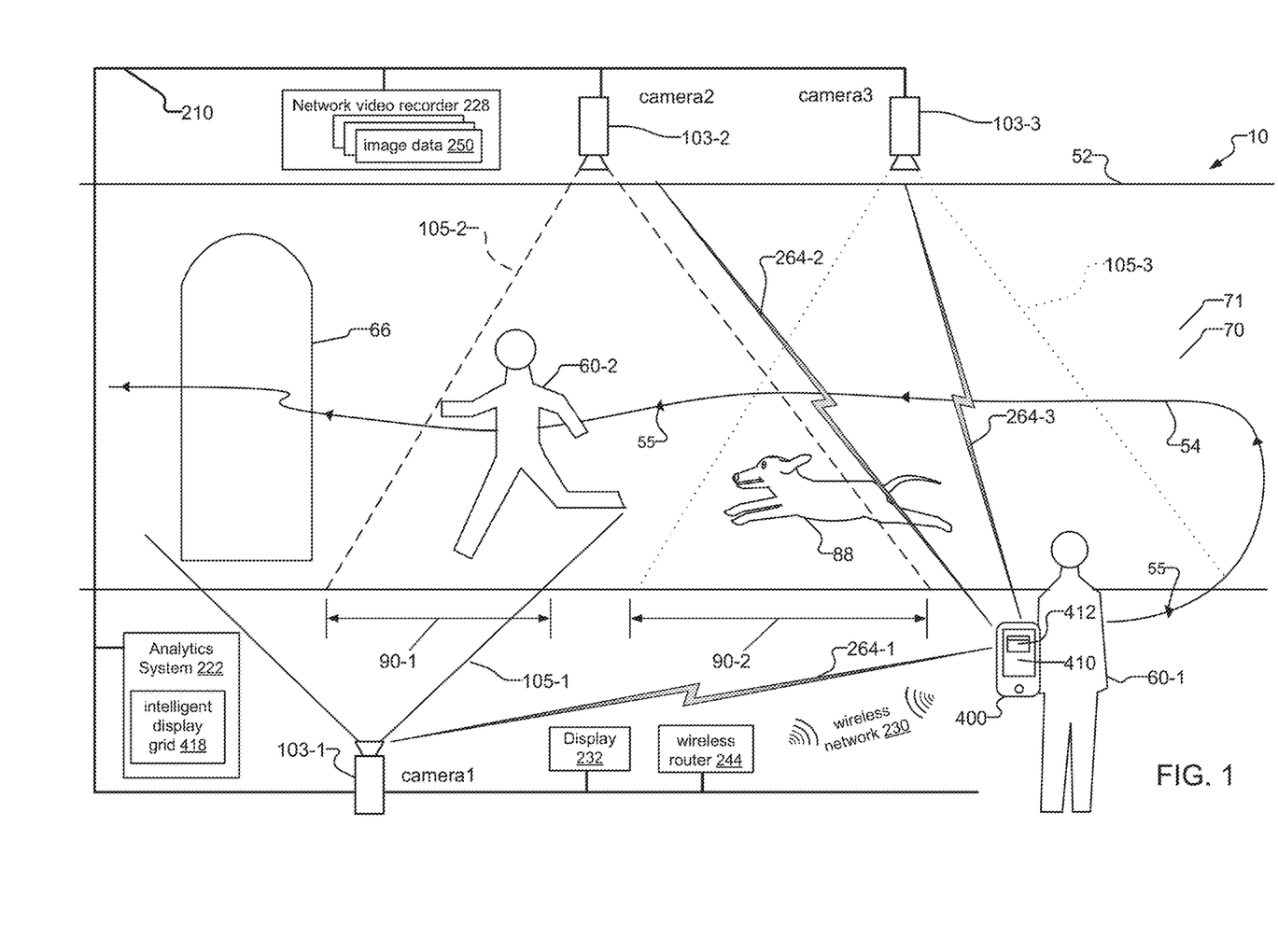
FIG. 1 is a schematic diagram showing a network of surveillance cameras installed at a premises, where each of the surveillance cameras is positioned to monitor an area at a premises for illustrating different embodiments of the invention for determining whether overlap exists in the scenes monitored by the surveillance cameras.

FIG. 1 shows an exemplary surveillance camera system 10 to which the invention is applicable.

Surveillance cameras 103-1 through 103-3, labeled camera1 through camera3, have fields of view 105-1 through 105-3, respectively. The cameras 103 are installed to monitor a corridor 70 within a premises 52, in one example. In the illustrated example, a doorway 66 is located at the end of the corridor 70. In another example, the cameras 103 are installed around a premises to monitor an alley 71 adjacent to the premises 52.

The surveillance cameras 103 communicate with each other over a local network 210 and with a local analytics system 222. The analytics system 222 creates an intelligent display grid 418 that includes image data 250 from at least two surveillance cameras 250. The system 10 might also include a network video recorder 228 that stores image data 250 captured by the surveillance cameras 103.

In other examples, the analytics system 222 could be a cloud based system that is accessible through a public network. In still other examples, the analytics system, as illustrated below, is integrated on one or more of the cameras or distributed over the processing resources of the several cameras and/or standalone systems. Such an analytics system could be partially or completely executing on the surveillance cameras 103.

However implemented, the analytics system 222 preferably includes or utilizes a map 180, which is an image representation of the area of the premises 52 (e.g. the corridor 70 and/or alley 71) under surveillance by the cameras 103. The installer 60 typically loads the map 180 onto the analytics system 222 after initial installation of the cameras 103 but prior to analyzing the corridor 70 and/or alley 71 for instances of overlap 90. The map 180 further preferably includes the locations of each of the cameras 103-1 through 103-3 of the network.

Each of the surveillance cameras 103-1 through 103-3 capture image data 250 of a scene within their respective fields of view 105-1 through 105-3 of the cameras. The surveillance cameras 103 transmit their image data 250 over the local network 210 for analysis by the analytics system 222 or retain the image data 250 to determine instances of overlap 90 between the scenes/fields of view 105 of the cameras 103.

A wireless router 244 provides a wireless network 230 such as WiFi or a cellular wide area network that enables exchange of wireless messages 264 between components. The wireless router 244 also has a local network interface that connects the wireless router 244 to the local network 210.

In one implementation, an installer 60-1 holds a user mobile computing device 400, also known as user device, for communicating with the surveillance cameras 103. Examples of user devices 400 include smartphones, tablet computing devices, and laptop computers running operating systems such as Windows, Android, Linux, or IOS, in examples. Each user device 400 includes a display screen or touch screen 410 and one or more applications 412, or "apps." The apps 412 execute upon the operating systems of the user devices 400.

The user device 400 can exchange wireless messages 264 directly between each surveillance camera 103 and/or the analytics systems 222 for this purpose. Exemplary wireless messages 264-1, 264-2 and 264-5 between user device 400 and surveillance cameras 103-1, 103-2, and 103-3 are shown. The surveillance cameras 103 also transmit their image data 250 over the wireless network 230 to the user device 400 in the wireless messages 264 via the wireless router 244 or directly via peer-to-peer connections. Even Bluetooth or similar protocol could be used. The user device 400 receives the wireless messages 264, extracts the image data 250 therein, and forwards the image data 250 to an analytics system to determine instances of overlap 90 between the scenes/fields of view 105 of the cameras 103.

It is important to note that additional embodiments of the analytics system 222 can exist in the system 10. In other examples, the analytics system 222 can be a remote analytics system maintained by a third party entity and which the surveillance cameras 103 access over a network cloud, a process running on the user devices 400, or a process integrated within one or more of the surveillance cameras 103. For the latter example, one of the cameras 103 typically functions as a master in a master/slave relationship between the cameras 103. The remaining cameras 103 functioning as slaves in this relationship transmit their image data 250 over the network 210 for analysis by the integrated analytics system of the master surveillance camera 103.

Via the wireless messages 264, user device 400 sends instructions to configure the cameras 103 and access the image data 250 on the cameras 103. The wireless messages 264 include both control and data wireless messages. In one example, data wireless messages 264 include frames of image data 250 that the surveillance cameras 103 send to the user mobile computing devices 400.

Specific examples showing how the cameras 103 might be deployed are illustrated. In one example, dome style cameras camera2 and camera3 are mounted overhead within a premises 52 to monitor corridor 70. Camera1 is a PTZ style camera mounted along a wall of corridor 70 such that the field of view 105-1 of camera1 provides a side view of the corridor 70. In another example, similar dome style cameras camera2 and camera3 are mounted overhead outside the premises 52 to monitor alley 71. In this example, camera1 might also be a PTZ style camera mounted along a wall of an adjacent building such that the field of view 105-1 of camera1 provides a side view of the alley 71.

An installer 60-1 might initially position camera1 and camera2 such that their fields of view 105-1 and 105-2 include a common portion of the scene, indicated by overlap 90-1. In a similar fashion, the installer 60-1 positions camera2 and camera3 to include a different portion of the scene in common between the fields of view 105-2 and 105-3 of camera2 and camera3, indicated by overlap 90-2. However, the initial positioning of the cameras 103 to achieve the desired overlap 90-1/90-2 or no overlap is based on an educated guess and requires verification. To determine that the desired amount of overlap 90-1/90-2 is achieved, in embodiments, the installer 60-1 utilizes the user device 400 in conjunction with the cameras 103 and the analytics system 222.

In a preferred embodiment, with respect to the corridor 70 monitored area example, the system 10 enables determination of overlap 90-1/90-2 during the installation of the cameras 103 in response to the installer 60-1 walking a critical path 54 through the monitored scene (e.g. corridor 70) while carrying the user device 400. The cameras 103 capture the installer/user device in the image data 250 of each of the cameras 103 during the traversal of the critical path 54, and send the image data 250 to the analytics system 222 to determine the overlap 90-1/90-2 based on correlating detected motion of the installer/user device among overlapping frames of image data 250.

In another embodiment, with respect to the alley 71 monitored area example, the analytics system 222 of the system 10 determines overlap 90-1/90-2 within the scene by first determining motion of objects in image data 250 of the scene. Unlike the preferred embodiment, where the motion is associated with a known and predetermined object moving within the scene in a specific manner (e.g. the installer/user device moving through the scene along the critical path 54), the objects and their expected manner of movement are not predetermined. In the example, objects such as a dog 88 and individual 60-2 are moving through the alley 71. Then, the analytics system 222 correlates the detected motion among the image data 250 from the surveillance cameras 103, determines that the correlated detected motion occurs at substantially the same time in the image data 250 from two or more different surveillance cameras 103, and infers that the motion is related and thus that the cameras have overlapping fields of view and the degree of that overlap.

It is also important to note that the analysis of the image data 250 provided by the analytics system 222 can either be executed in real time, or at a time after the cameras 103 are installed, in a forensics fashion. For the real time analysis, the analytics system 222 preferably receives the image data 250 over the local network 210 from the cameras 103 just after the cameras 103 capture the image data 250 of the scene. For the forensic analysis of the image data 250, the analytics system 222 can analyze previously recorded image data 250 of the scene stored on a network video recorder 228, or image data 250 stored locally within the cameras 103, in examples.

Figure 2A:
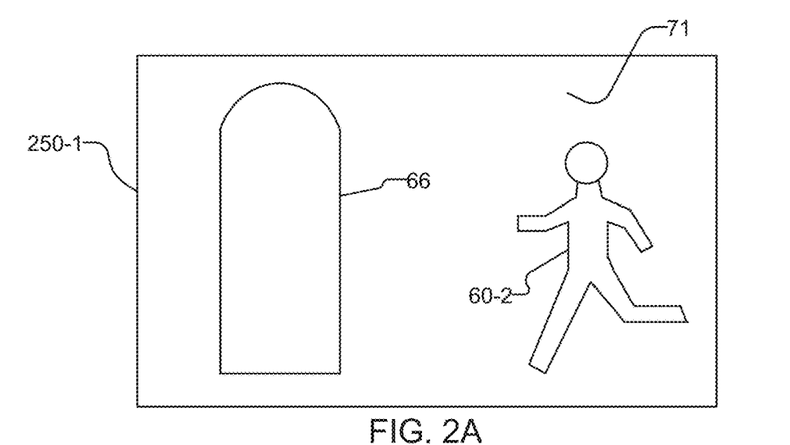
FIG. 2A-2C are exemplary frames of image data representative of the fields of view of each of the surveillance cameras labeled camera1, camera2, and camera3 in FIG. 1, respectively, and where the image data is associated with objects moving in a monitored alley adjacent to a premises.
Figure 2B:
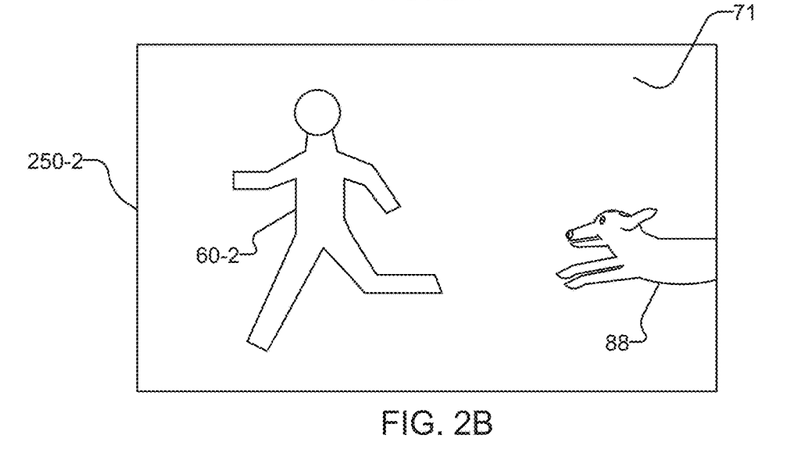
Figure 2C:
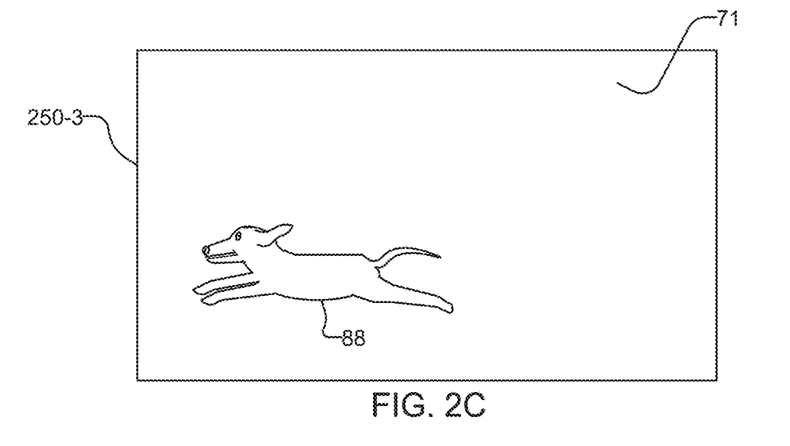

FIG. 2A-2C show exemplary frames of image data 250-1 through 250-3 from camera1, camera2, and camera3, respectively. With respect to FIG. 1, the objects included within the image data 250 are associated with the alley 71 monitored area and are shown to illustrate overlap among image data 250/fields of view 105 of the cameras 103.

In FIG. 2A, a frame of image data 250-1 from camera1 includes a scene of the alley 71 including doorway 66 and individual 60-2. In FIG. 2B, a frame of image data 250-2 from camera2 includes a different scene of the same alley 71, where the scene includes individual 60-2 and a portion of dog 88. Finally, in FIG. 2C, a frame of image data 250-3 from camera2 includes yet another scene of the same alley 71, where the scene includes the entirety of the dog 88. With respect to FIG. 2A and FIG. 2B, because at least a portion of the same object (here, the entirety of individual 60-2) exists in at least two fields of view 105-1/105-2, the image data 250-1/250-2 is said to overlap. With respect to FIG. 2A and FIG. 2B, because at least a portion of the same object (here, the front half of dog 88) exists in at least two fields of view 105-2/105-3, the image data 250-2/250-3 is said to overlap.

Figure 3:
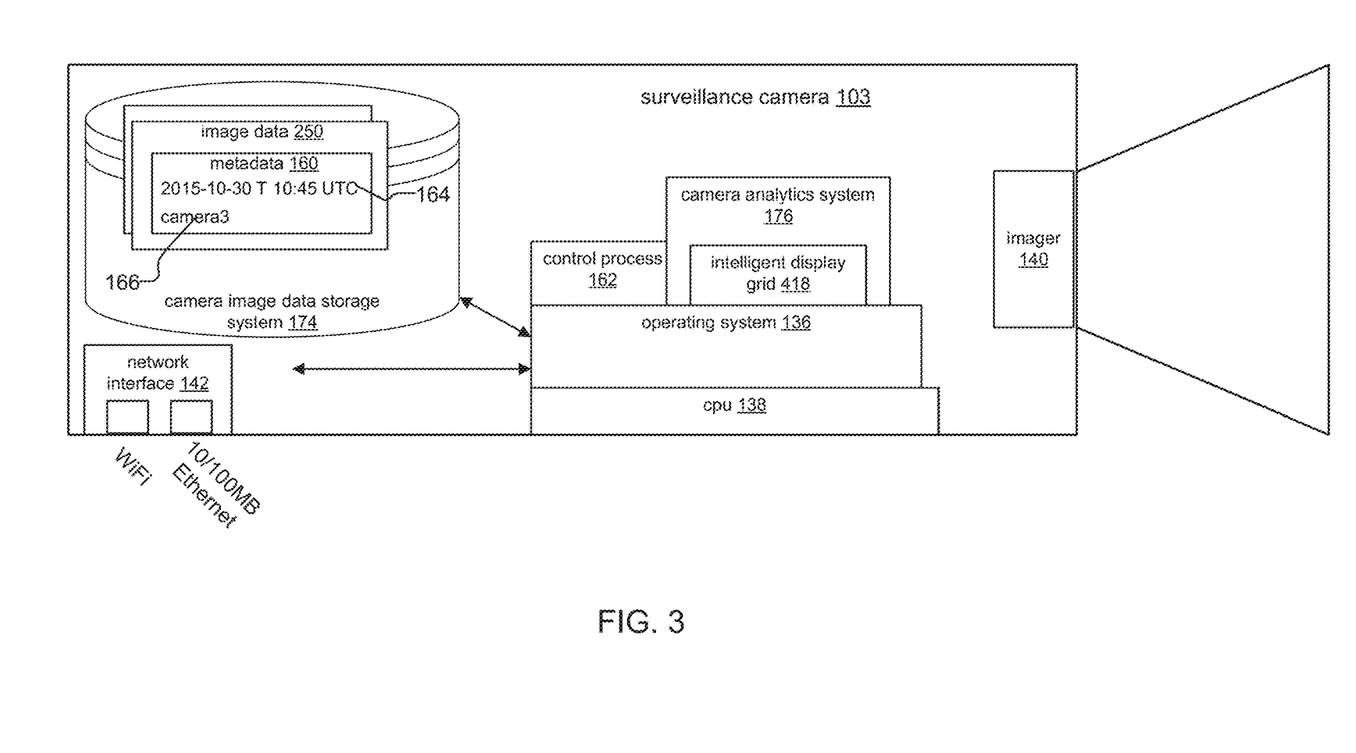
FIG. 3 is a schematic diagram showing some of the components of an exemplary surveillance camera.

FIG. 3 shows some of the components of an exemplary surveillance camera 103.

The camera 103 includes a processing unit (CPU) 138, an imager 140, a camera image data storage system 174 and a network interface 142. An operating system 136 runs on top of the CPU 138. A number of processes or applications are executed by the operating system 136. One of the processes is a control process 162. In some embodiments, a camera analytics system 176 process is also included within one or more of the surveillance cameras 103 in the network 210. This camera analytics system 176 can also create an intelligent display grid 418.

The camera 103 saves image data 250 captured by the imager 140 to the camera image data storage system 174, locally, and/or to the NVR 228, remotely. Each camera 103 can support one or more streams of image data 250. The control process 162 receives and sends messages 264 via its network interface 142. Each camera 103 also saves metadata 160 for the image data 250, including a timestamp 164 and camera number 166 for each frame of image data 250.

Figure 4:
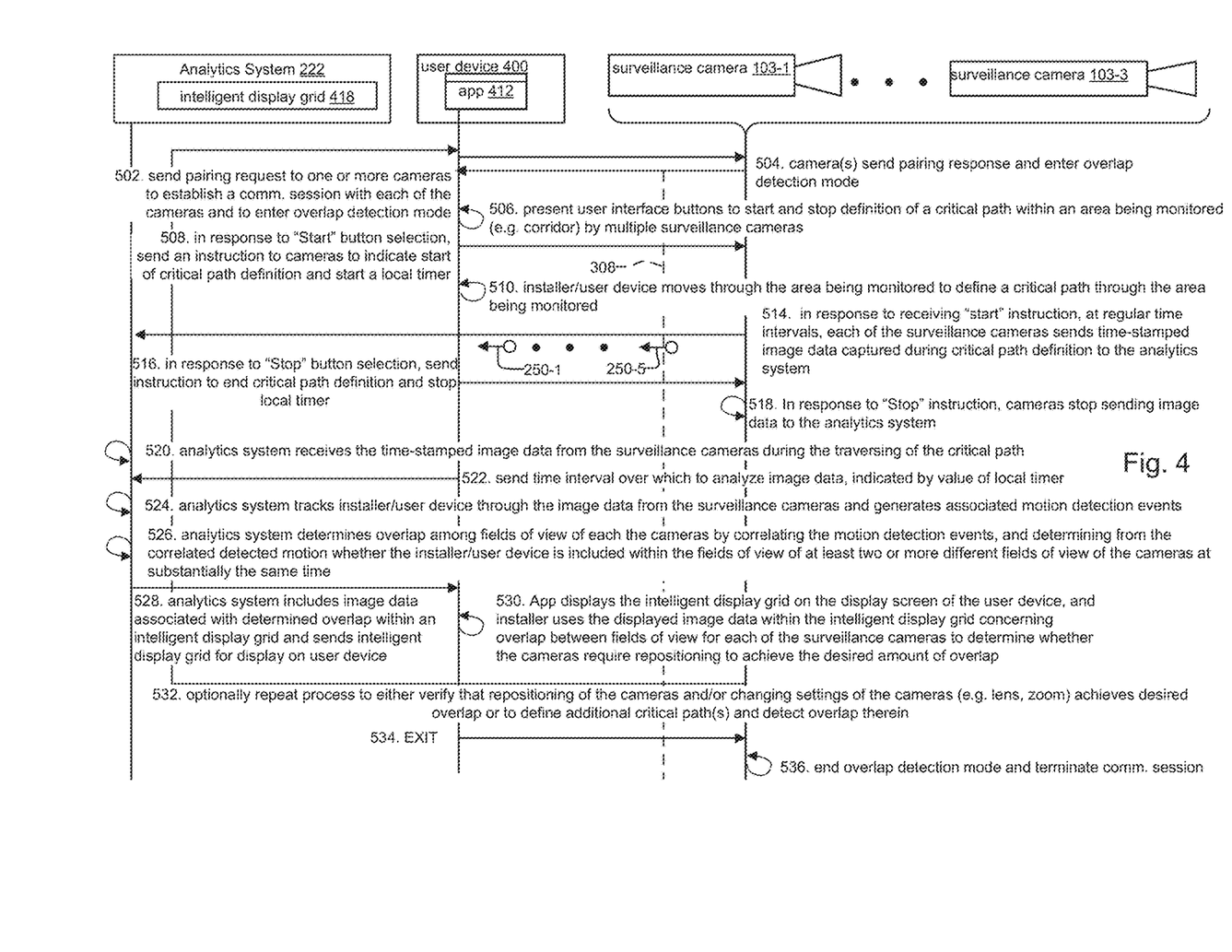
FIG. 4 is a sequence diagram showing a preferred installer method embodiment of the present invention, where the method enables an installer to determine overlap among fields of view of the surveillance cameras during installation of the cameras, and where the fields of view include an installer carrying a mobile user device as the installer/user device moves along a critical path within a monitored corridor of the premises.

FIG. 4 describes a preferred "installer method" embodiment of the system 10 for determining overlap 90 among the fields of view of the surveillance cameras 103. The method is described by way of an example critical path 54 traversal by an installer carrying a user device 400, where the installer/user device moves through a monitored area (e.g. the corridor 70 of FIG. 1) along the critical path 54. The method also provides details of interactions between major components of the system 10 both during and after this process.

In step 502, an app 412 running on the user device 400 sends a pairing request to one or more cameras 103 to establish a communications session 308 with each of the cameras 103 and for the surveillance cameras 103 to enter an overlap detection mode. According to step 504, the cameras 103 send a pairing response message and enter overlap detection mode. As a result of step 504, a communication session 308 is established between the each of the cameras 103 currently in overlap detection mode and the app 412, in one example. In other examples, the communication is established with the analytics systems 222, 176.

In step 506, the app 412 then presents user interface buttons to start and stop definition of a critical path 54 within an area being monitored (e.g. corridor 70) by multiple surveillance cameras 103.

According to step 508, in response to selection of a "Start" button on the user interface of the app 412 by the installer 60, the app 412 starts a local timer and sends an instruction to the cameras 103 to indicate start of the critical path definition. In step 510, the installer/user device moves through the area being monitored to define a critical path 54 through the area being monitored.

In step 514, in response to the receiving the "start" button instruction, at regular time intervals, each of the surveillance cameras 103 sends time-stamped image data 250 captured during the definition of the critical path 54 to an analytics system 222. According to step 516, in response to selection of a "Stop" button on the user interface of the app 412 by the installer 60, the app 412 stops the local timer and sends an instruction to the cameras 103 to end definition of the critical path 54. In response to receiving the "stop" instruction, the cameras 103 send their remaining image data 250 to the analytics system 222, in step 518.

According to step 520, the analytics system 222 and/or 176 receives the time stamped image data 250 from the surveillance cameras 103 during definition of the critical path 54. In step 522, the app 412 sends the time interval over which to analyze the image data 250, indicated by the value of the local timer. The analytics system 222 and/or 176 then tracks the installer/user device through the image data 250 from the surveillance cameras 103, in step 524.

In step 526, the analytics system 222 and/or 176 determines overlap 90 among fields of view 105 of each the cameras 103 by correlating the motion detection events, and determining from the correlated detected motion whether the installer/user device is included within the fields of view 105 of at least two or more different fields of view 105 of the cameras 103 at substantially the same time. Then, in step 528, the analytics system 222 and/or 176 includes image data 250 associated with the determined overlap 90 (e.g. overlapping fields of view 105 of the cameras 103) within an intelligent display grid 418 and sends the intelligent display grid 418 for display on the user device 400. The image data 250 displayed within the display grid 418 is from at least two surveillance cameras 103 and has at least one portion of an object within a scene monitored by the surveillance cameras included within the image data 250.

According to step 530, the app 412 displays the intelligent display grid 418 on the display screen 410 of the user device 400, and the installer 60-1 uses the displayed image data 250 within the intelligent display grid 418 concerning overlap 90 between fields of view 105 for each of the surveillance cameras 103 to determine whether the cameras 103 require repositioning to achieve the desired amount of overlap 90.

In step 532, the installer 60-1 optionally repeats this process to either verify that repositioning of the cameras 103 and/or changing settings of the cameras 103 (e.g. lens, zoom) achieves the desired overlap 90 or to define additional critical path(s) 54 and detect overlap 90 therein. Changing the lenses of the cameras 103 can cause a corresponding change in the fields of view 105 of the cameras 103 for achieving the desired overlap 90. This change is required, in one example, when the lenses are of a fixed focus type, which are designed to work for a single, specific working distance. Replacing a fixed lens with a varifocal lens, in one example, enables the installer 60-1 to subsequently adjust the focal length, angle of view, and level of zoom of the cameras 103, thereby enabling adjustment of overlap 90 among fields of view 105 of two or more surveillance cameras 103. Additionally, changing a zoom setting of the cameras 103 can cause a corresponding change in the fields of view 105 of the cameras 103 in accordance with the installer's overlap 90 objectives. This is a typical course of action for adjusting overlap 90 when the cameras 103 are PTZ type cameras, in one example. In step 534, the installer 60-1 selects an option within the app 412 to exit overlap detection mode, and the app 412 sends an associated message 264 to the cameras 103 in response. Finally, in step 536, the cameras 103 receive the exit message 264, and end overlap detection mode and terminate the communications session 308 in response.

Figure 5:
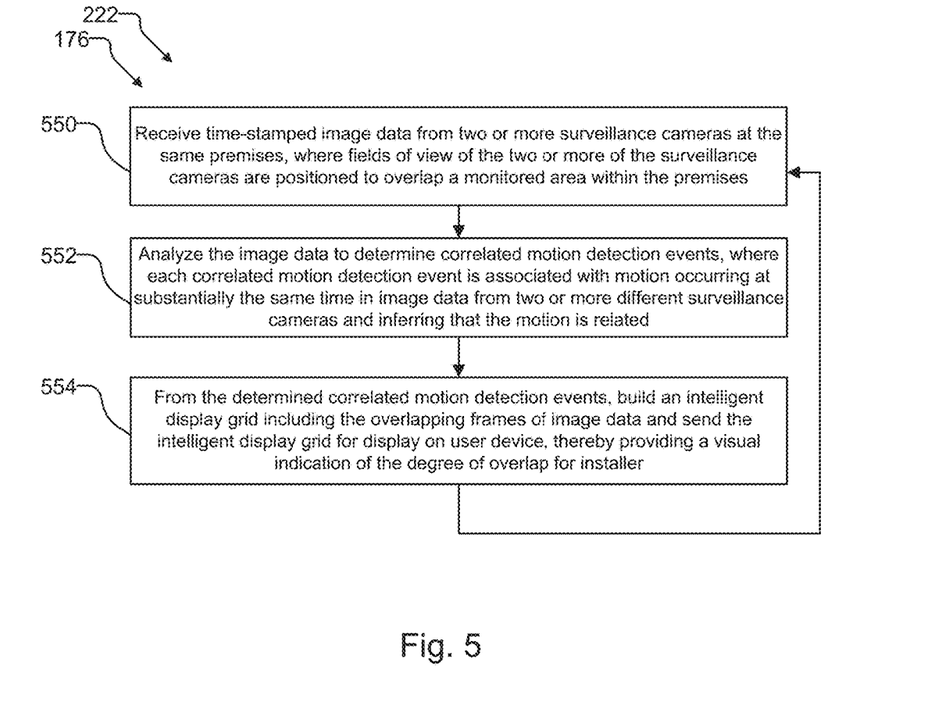
FIG. 5 is a flow chart showing a method for another embodiment of the invention, where an analytics system infers overlap from image data captured by the surveillance cameras.

FIG. 5 describes a method for another embodiment, where the overlap 90 is inferred from image data 250 taken of the scene and sent by the analytics system 222 and/or 176.

In step 550, the analytics system 222 and/or 176 receives time-stamped image data 250 from two or more surveillance cameras 103 at the same premises 52, where fields of view 105 of the two or more of the surveillance cameras 103 are positioned to overlap a monitored area within the premises 52.

In step 552, the analytics system 222 and/or 176 analyzes the image data 250 to determine correlated motion detection events, where each correlated motion detection event is associated with motion occurring at substantially the same time in image data 250 from two or more different surveillance cameras 103 and inferring that the motion is related.

Then, in step 554, from the determined correlated motion detection events, the analytics system 222 builds an intelligent display grid 418 including the overlapping frames of image data 250 and sends the intelligent display grid 418 for display on the user device 400, thereby providing a visual indication of the degree of overlap 90 for the installer or operator 60-1. Upon conclusion of step 554, the method transitions back to step 550 to receive the next frames of time-stamped image data 250 from the surveillance cameras 103.

Figure 6:
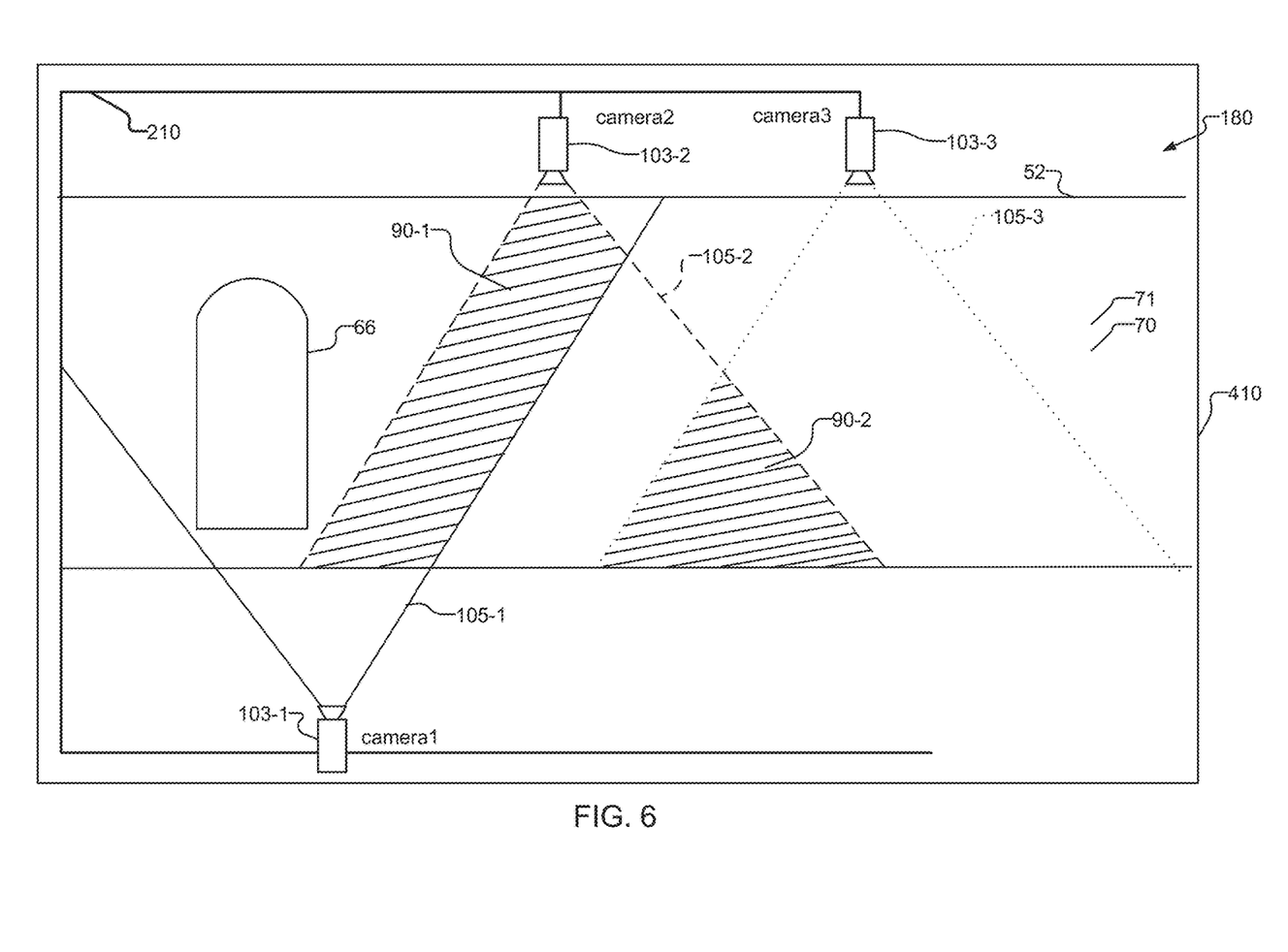
FIG. 6 shows a floor plan map of an area within a premises monitored by surveillance cameras, where the methods of FIG. 4 and FIG. 5 determine overlap in the area monitored by the surveillance cameras, include the overlap as shaded areas within the map, and present the map for display on a mobile user device.

FIG. 6 shows an image representation of a map 180 of a monitored area rendered on a display screen 410 of a user device 400. The map 180 is for monitored area (e.g. corridor 70 and/or alley 71) of the premises 52 in FIG. 1. The map 180 has been modified by the overlap detection methods of FIG. 3 and FIG. 4. The analytics systems of these methods were able to determine overlap regions 90-1 and 90-2, and highlighted the overlap 90 graphically within the map 180 as shaded areas before sending the map 180 for display on the user device 400. This enables the installer 60 or operator to have an "at a glance" visual indication of overlap 90 among the fields of view 105 of two or more surveillance cameras 103.

Figure 7:
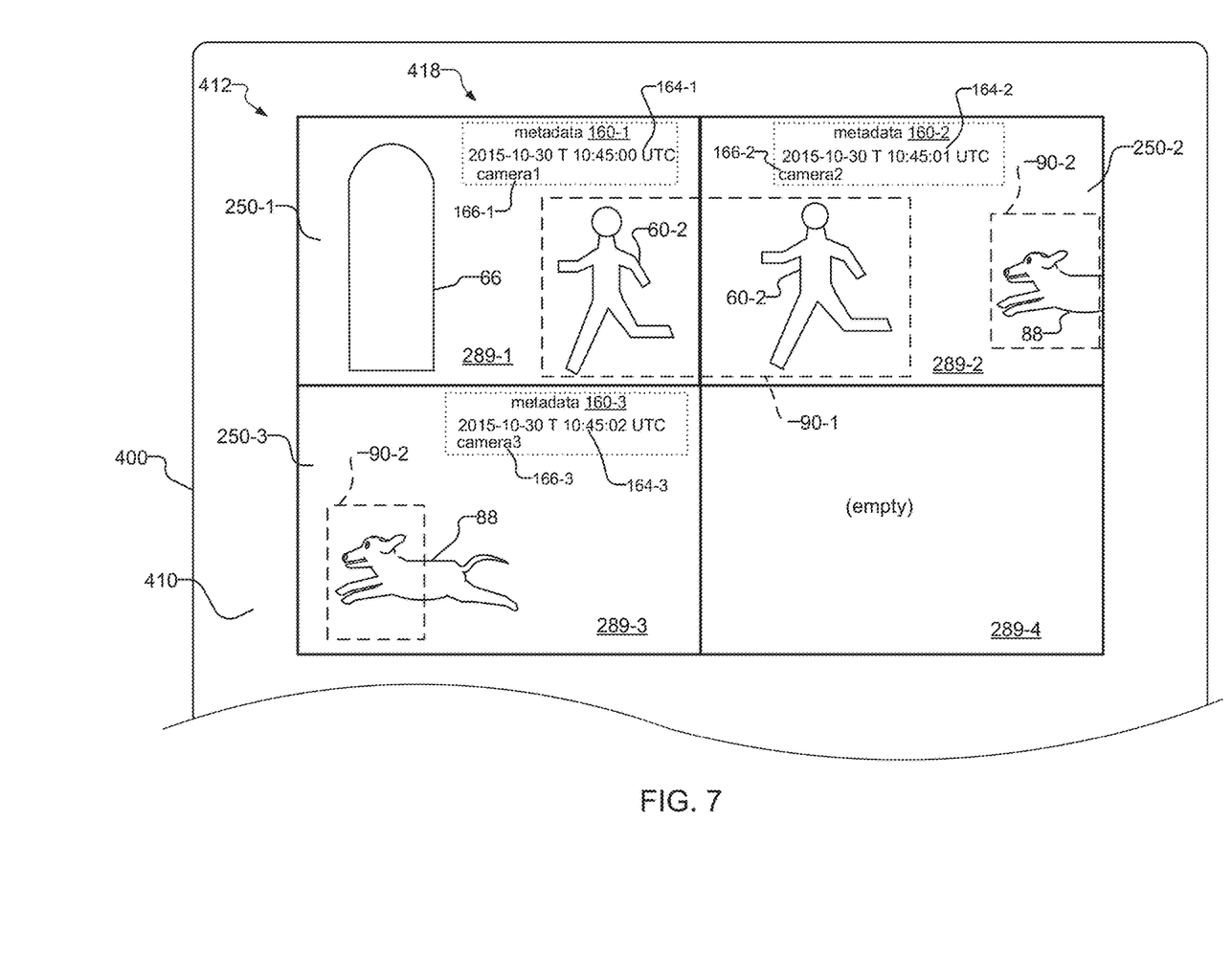
FIG. 7 shows an exemplary intelligent display grid created by the analytics system in the method of FIG. 5 that includes overlapping frames of image data, where the image data is representative of the fields of view of the cameras in FIG. 2A-2C, and where the intelligent display grid is presented for display on the mobile user device for enabling an operator to obtain an "at a glance" determination of overlap among the fields of view of the surveillance cameras.

FIG. 7 shows an image representation of an intelligent display grid 418 rendered on a display screen 410 of a user device 400 in accordance with the method of FIG. 5. The intelligent display grid 418 enables the installer or operator 60 to have an "at a glance" visual indication of instances of overlap 90-1 and 90-2 within the image data 250 and therefore an indication of overlap 90-1/90-2 associated with fields of view 105 of the cameras 103.

The intelligent display grid 418 includes panes 289. Each of the panes 289 can include image data 250, where the image data 250 is provided by the analytics system 222 and/or 176 in accordance with the overlap detection methods of FIG. 4 and FIG. 5. The image data 250 displayed in the panes 289 are formatted by the analytics system 222 and/or 176 into frames to enable a visual representation of the image data 250 within the panes 289. Metadata 160-1 through 160-3 for each of the frames of image data 250-1 through 250-3 are optionally displayed within panes 289-1 through 289-3, respectfully, of the intelligent display grid 418. Pane 289-4 is included within the display grid 418 to provide a symmetric visual presentation of the grid 418 but does not include any image data 250.

With reference to the method of FIG. 5 and image data 250-2 and 250-1, in one example, the analytics system 222 and/or 176 infers overlap 90-1 among frames of image data 250-2/250-1 by first detecting motion in the image data 250-2/250-1 associated with individual 60-2, and generating motion detection events for the detected motion. Then, the analytics system 222 correlates the motion detection events to determine if the events occurred at substantially the same time. Here, because the value of timestamp 164-2 for image data 250-2 of camera2 is only one second greater than the timestamp 164-1 for image data 250-1 of camera1, the analytics system 222 can infer that the correlated motion detection events are likely related. As a result, the analytics system 222 includes the image data 250-1 and 250-2 in the intelligent display grid 418 to provide a visual indication of the overlap 90-1 between the image data 250-1/250-2, and therefore to provide a visual indication of overlap 90-1 among associated fields of view 105-1/105-2 of camera1 103-1 and camera2 103-2, respectively.

With reference to the method of FIG. 5 and image data 250-3 and 250-2, in another example, the analytics system 222 and/or 176 infers overlap 90-2 among frames of image data 250-3/250-2 by first detecting motion in the image data 250-3/250-2 associated with individual 60-2 and/or dog 88, and generating motion detection events for the detected motion. Then, the analytics system 222 correlates the motion detection events to determine if the events occurred at substantially the same time. Here, because the value of timestamp 164-3 for image data 250-3 of camera3 is only one second greater than the timestamp 164-2 for image data 250-2 of camera2, the analytics system 222 can infer that the correlated motion detection events are likely related. As a result, the analytics system 222 includes the image data 250-3 and 250-2 in the intelligent display grid 418 to provide a visual indication of the overlap 90-2 between the image data 250-2/250-3, and therefore to provide a visual indication of overlap 90-2 among associated fields of view 105-2/105-3 of camera2 103-2 and camera3 103-3, respectively.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining overlap of fields of view for surveillance cameras of a network, comprising:
defining a critical path monitored by the surveillance cameras via a mobile user device carried by the installer that presents a user interface to start and stop definition of the critical path;
the surveillance cameras capturing image data of the scene during the definition of the critical path and transferring the image data to an analytics system; and
the analytics system determining overlap from the image data along the critical path.

2. The method of claim 1, wherein the analytics system determining the overlap from the image data comprises the analytics system correlating motion within the image data to determine overlap for at least two of the surveillance cameras.

3. The method of claim 2, wherein detecting the motion within the image data from the network of surveillance cameras comprises tracking the mobile user device and/or an installer carrying the mobile user device as the mobile user device is moved along the path within a premises.

4. The method of claim 2, further comprising:
the mobile user device traversing the path within a premises; and
the analytics system determining from correlated detected motion within the image data from the surveillance cameras whether the mobile user device and/or the installer is included in the image data from at least two of the surveillance cameras.

5. The method of claim 4, further comprising determining that the image data from the at least two of the surveillance cameras was captured at substantially the same time.

6. The method of claim 4, wherein detecting motion within image data from the network of surveillance cameras comprises identifying objects within the image data and tracking the objects across the fields of view of the surveillance cameras.

7. The method of claim 4, wherein correlating detected motion among the image data from different surveillance cameras comprises generating motion detection events in response to detecting motion within the image data, and correlating the motion detection events.

8. The method of claim 1, further comprising building a display grid including image data from at least two surveillance cameras having at least one portion of an object within a scene monitored by the surveillance cameras included within the image data, and sending the display grid for display on a user device.

9. A surveillance camera system, comprising:
two or more surveillance cameras generating image data of a scene;
a user device that presents a user interface to start and stop definition of a critical path; and
an analytics system that:
receives the image data from the surveillance cameras;
tracks the mobile user device and/or an installer carrying the mobile user device as the mobile user device is moved along the critical path within a premises; and
determines overlap within the scene by correlating detected motion among the image data from different surveillance cameras, and by determining that the correlated detected motion occurs at substantially the same time in the image data from two or more different surveillance cameras and inferring that the motion is related.

10. The method of claim 9, further comprising building a display grid that includes the image data associated with the correlated motion and displaying the display grid to provide a visual indication of the overlap.

11. The system of claim 9, wherein the analytics system creates a display grid that includes image data from at least two surveillance cameras.

12. The system of claim 9, wherein the analytics system tracks a mobile user device and/or an installer carrying the mobile user device as the mobile user device is moved along a critical path within a premises.

13. The system of claim 9, wherein the analytics system determines from the correlated motion within the image data whether the mobile user device and/or the installer is included in the image data from at least two of the surveillance cameras.

14. The system of claim 13, wherein the analytics system determines that the image data from the at least two of the surveillance cameras was captured at substantially the same time.

15. The system of claim 9, wherein the analytics system identifies objects within the image data and tracks the objects across fields of view of the surveillance cameras.

16. The system of claim 9, wherein the analytics system generates motion detection events in response to detecting motion within the image data, and correlates the motion detection events.

* * * * *